(12) United States Patent
Iguchi

(10) Patent No.: US 10,178,271 B2
(45) Date of Patent: Jan. 8, 2019

(54) FACSIMILE APPARATUS AND CONTROL METHOD OF FACSIMILE APPARATUS

(71) Applicant: CANON KABUSHIKI KAISHA, Tokyo (JP)

(72) Inventor: Junji Iguchi, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/401,830

(22) Filed: Jan. 9, 2017

(65) Prior Publication Data

US 2017/0208206 A1 Jul. 20, 2017

(30) Foreign Application Priority Data

Jan. 15, 2016 (JP) .................. 2016-005775

(51) Int. Cl.
| | |
|---|---|
| *H04M 1/24* | (2006.01) |
| *H04M 3/08* | (2006.01) |
| *H04M 3/22* | (2006.01) |
| *H04N 1/327* | (2006.01) |
| *H04N 1/00* | (2006.01) |

(52) U.S. Cl.
CPC ..... *H04N 1/32728* (2013.01); *H04N 1/00891* (2013.01); *H04N 2201/0093* (2013.01)

(58) Field of Classification Search
CPC ........... H04N 1/32016; H04N 1/32704; H04N 1/32708; H04N 1/32716; H04N 1/32717; H04N 1/23719; H04N 1/32728; H04N 1/00891; H04N 9/14; H04M 11/066; H04M 1/82; H04M 10/484; H04M 11/007; G06F 1/3209; G06F 1/3278; G06K 15/406; G06T 17/10
USPC ......... 379/29.03, 29.04, 29.07, 29.08, 93.05, 379/93.09, 100.01, 100.05, 100.06, 379/100.15
See application file for complete search history.

(56) References Cited

U.S. PATENT DOCUMENTS

| | | | | |
|---|---|---|---|---|
| 5,809,132 | A | * 9/1998 | Sakamoto | ............... H04M 1/82 379/161 |
| 5,977,062 | A | * 11/1999 | Cooper | ................. C07K 9/008 514/2.4 |

(Continued)

FOREIGN PATENT DOCUMENTS

JP 2004-289315 A 10/2004

*Primary Examiner* — Binh Kien Tieu
(74) *Attorney, Agent, or Firm* — Canon U.S.A., Inc. IP Division

(57) ABSTRACT

A facsimile apparatus includes a storage unit, a first detection unit, and a second detection unit. The storage unit stores a parameter based on a connection standard of a telephone-line connected to the facsimile apparatus, and an apparatus direct-current resistance of the facsimile apparatus. The first detection unit detects a first voltage that is a voltage at a line-open time of a telephone line connected to the facsimile apparatus. The second detection unit detects a second voltage that is a voltage at a line-capture time of the telephone line. By using the first voltage, the second voltage, the parameter, and the apparatus direct-current resistance, a voltage to be a threshold for determination of line capture is determined. By using a voltage detected from the telephone line and the voltage to be the threshold determined by the first determination unit, whether the telephone line is captured is determined.

15 Claims, 6 Drawing Sheets

(56) References Cited

U.S. PATENT DOCUMENTS

| | | | | |
|---|---|---|---|---|
| 6,611,580 | B1* | 8/2003 | Dahan | H04L 12/66 |
| | | | | 379/93.05 |
| 7,720,201 | B2* | 5/2010 | Ito | H04B 3/54 |
| | | | | 370/250 |
| 2002/0080952 | A1* | 6/2002 | Sonnleithner | H04N 1/32704 |
| | | | | 379/377 |
| 2006/0233329 | A1* | 10/2006 | Ito | H04M 11/066 |
| | | | | 379/100.01 |
| 2006/0256395 | A1* | 11/2006 | Ito | H04N 1/32016 |
| | | | | 358/440 |
| 2007/0041539 | A1* | 2/2007 | Asai | H04M 15/06 |
| | | | | 379/142.01 |
| 2007/0121906 | A1* | 5/2007 | Kim | H04M 1/82 |
| | | | | 379/350 |
| 2009/0129559 | A1* | 5/2009 | Fukami | H04M 11/066 |
| | | | | 379/24 |
| 2010/0189234 | A1* | 7/2010 | Nakazawa | H04M 11/066 |
| | | | | 379/100.01 |
| 2010/0246779 | A1* | 9/2010 | Kabeya | H04M 3/005 |
| | | | | 379/27.01 |
| 2012/0194856 | A1* | 8/2012 | Koizumi | H04N 1/32719 |
| | | | | 358/1.15 |
| 2013/0083910 | A1* | 4/2013 | Baba | H04M 11/007 |
| | | | | 379/100.01 |
| 2014/0043637 | A1* | 2/2014 | Mori | G06K 15/406 |
| | | | | 358/1.13 |

* cited by examiner

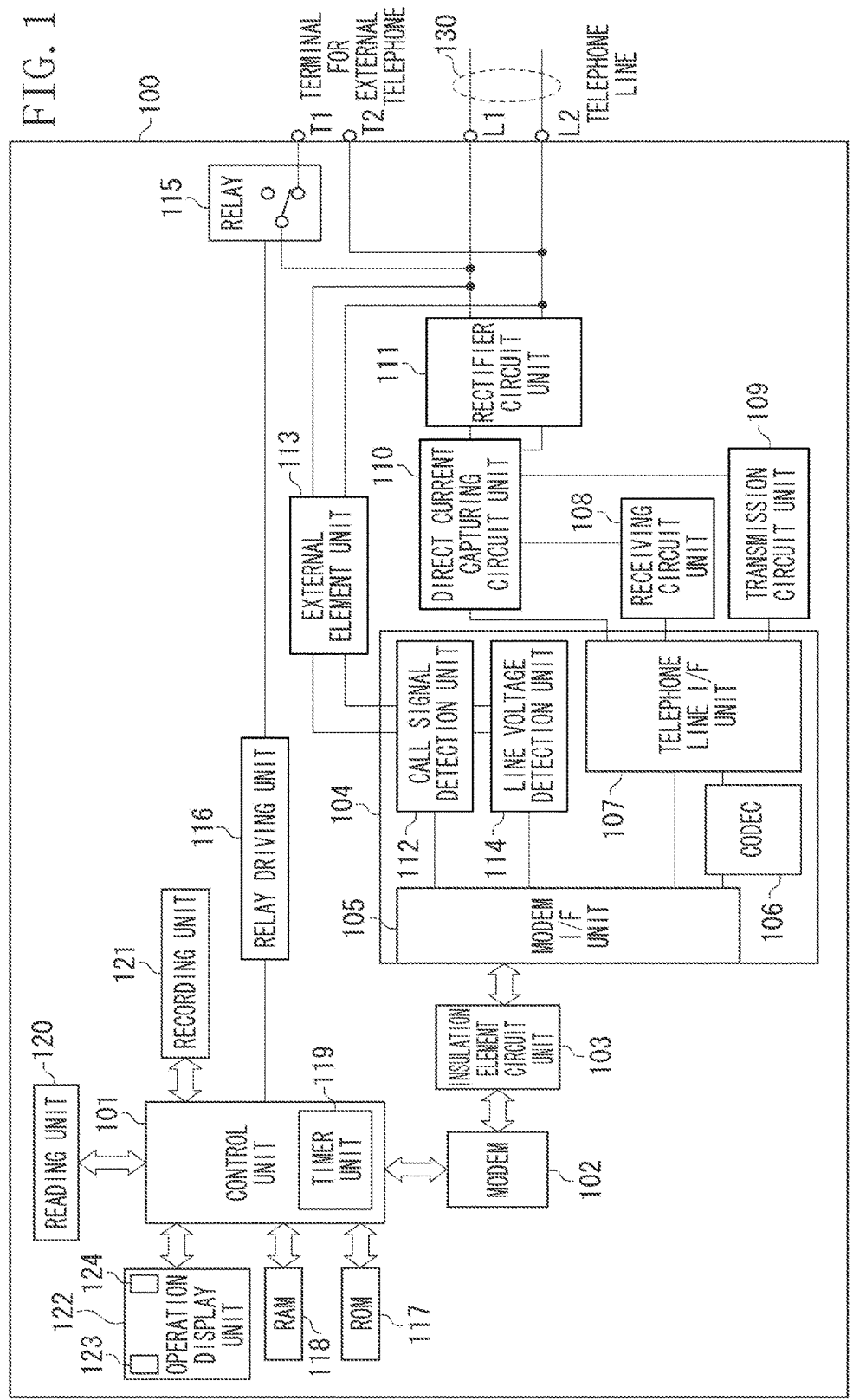

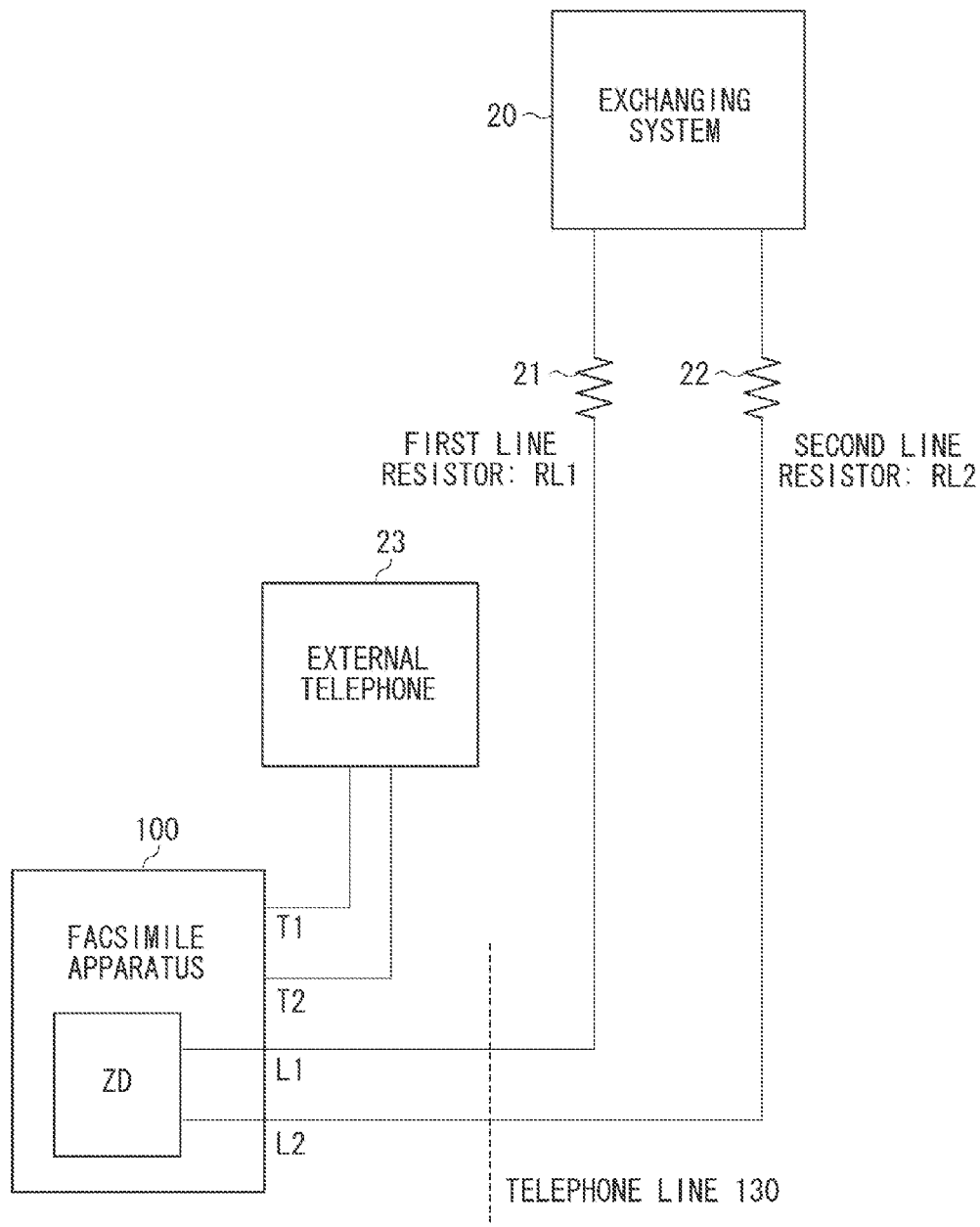

FIG. 3A

| COUNTRY CODE | LINE VOLTAGE MAXIMUM VALUE:VLmax | LINE VOLTAGE MINIMUM VALUE:VLmin | TERMINAL DIRECT-CURRENT RESISTANCE MAXIMUM VALUE:Zmax | TERMINAL DIRECT-CURRENT RESISTANCE MINIMUM VALUE:Zmin |
|---|---|---|---|---|
| 01 | 53 | 42 | 300 | 50 |
| 02 | 48 | 40 | 400 | 100 |
| 03 | 60 | 50 | 300 | 50 |
| 04 | 50 | 40 | 450 | 100 |

FIG. 3B

| APPARATUS DIRECT-CURRENT RESISTANCE: ZD | 150 |
|---|---|
| LINE OPEN VOLTAGE: V0 | 5.0 |
| LINE-CAPTURE-TIME VOLTAGE: Vh | 7.5 |
| OFF-HOOK REFERENCE VOLTAGE: Vhref | 13.8 |

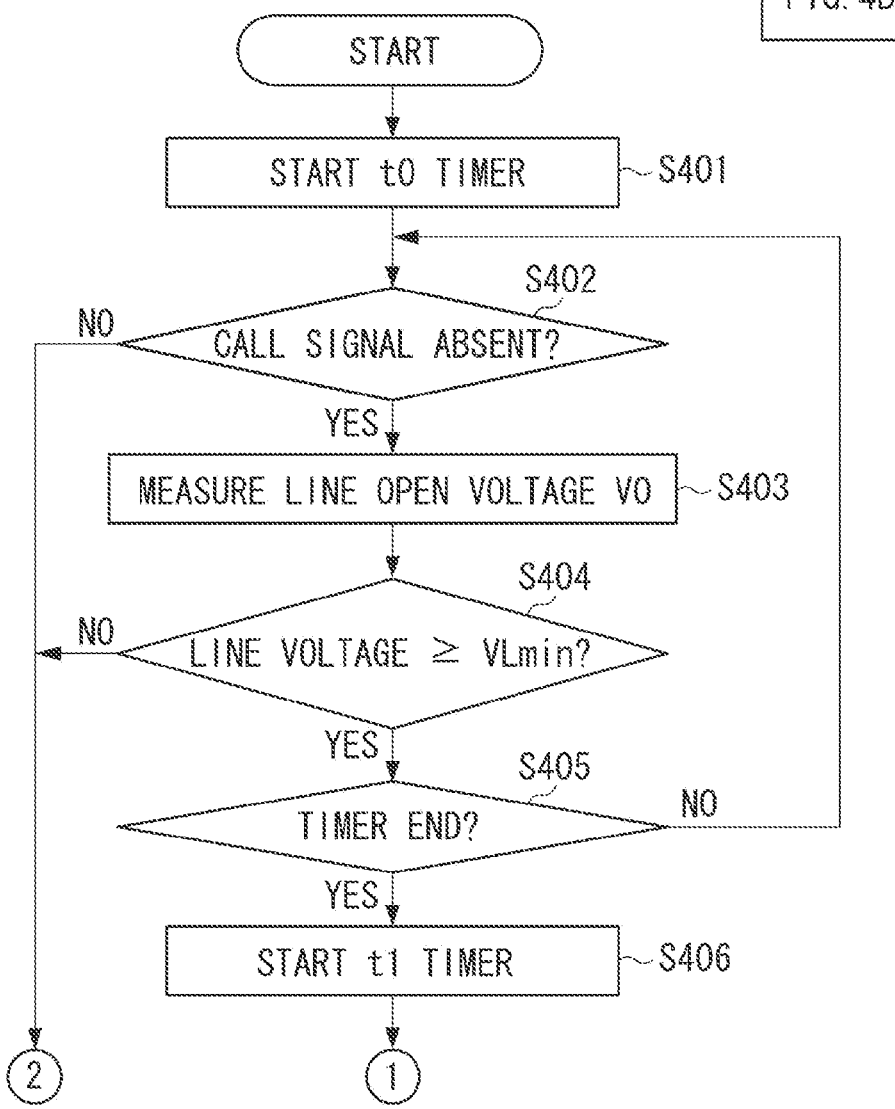

FACSIMILE APPARATUS AND CONTROL METHOD OF FACSIMILE APPARATUS

BACKGROUND OF THE INVENTION

Field of the Invention

An embodiment relates to a facsimile apparatus and a control method of the facsimile apparatus.

Description of the Related Art

In recent years, an increasing number of facsimile apparatuses have been downsized using a semiconductor data access arrangement (DAA) for an interface circuit unit with a telephone line. When a line voltage is monitored using this DAA, a voltage is conventionally measured when a user brings an external telephone into off-hook, and the measured voltage is used as a reference voltage. The DAA then detects a line voltage and compares the detected line voltage with the reference voltage to detect off-hook state. When these voltages are approximately equal, the DAA determines that off-hook is detected as discussed in Japanese Patent Application Laid-Open No. 2004-289315.

However, according to such a conventional technique, it is necessary to measure and set a line voltage by user operation at the time of installation. Therefore, it is necessary to set a line voltage again by the user operation, when the user switches to another line, or when the line voltage varies, or when the external telephone is changed. This operation complicated and may lead to false detection.

For example, in a case where the user change the external telephone to another telephone, after a line voltage is decided as an off-hook detection voltage when the user brings the external telephone into off-hook at the time of installation, a line voltage at off-hook time after this change is different from the determined line voltage. This may lead to off-hook false detection.

SUMMARY OF THE INVENTION

In an embodiment, a facsimile apparatus is capable of automatically preventing off-hook false detection, even if a line voltage varies, or an external telephone or a line is changed.

According to an aspect of the present invention, a facsimile apparatus includes a storage unit configured to store a parameter based on a connection standard of a telephone-line connected to the facsimile apparatus, and an apparatus direct-current resistance of the facsimile apparatus, a first detection unit configured to detect a first voltage that is a voltage at a line-open time of a telephone line connected to the facsimile apparatus, a second detection unit configured to detect a second voltage that is a voltage at a line-capture time of the telephone line, a first determination unit configured to determine a voltage to be a threshold for determination of line capture, by using the first voltage, the second voltage, the parameter, and the apparatus direct-current resistance, and a second determination unit configured to determine whether the telephone line is captured, by using a voltage detected from the telephone line and the voltage to be the threshold determined by the first determination unit.

Further features of the present invention will become apparent from the following description of embodiments with reference to the attached drawings.

BRIEF DESCRIPTION OF THE DRAWINGS

FIG. 1 is a block diagram illustrating a configuration of a facsimile apparatus according to a first embodiment.

FIG. 2 is a block diagram illustrating connection of the facsimile apparatus with an external telephone and a telephone line.

FIGS. 3A and 3B is a line parameter table of each country's standard, and a measurement data table, respectively.

FIG. 4, including FIGS. 4A and 4B, is a flowchart illustrating operation of the facsimile apparatus according to the first embodiment.

DESCRIPTION OF THE EMBODIMENTS

Figure 4B:
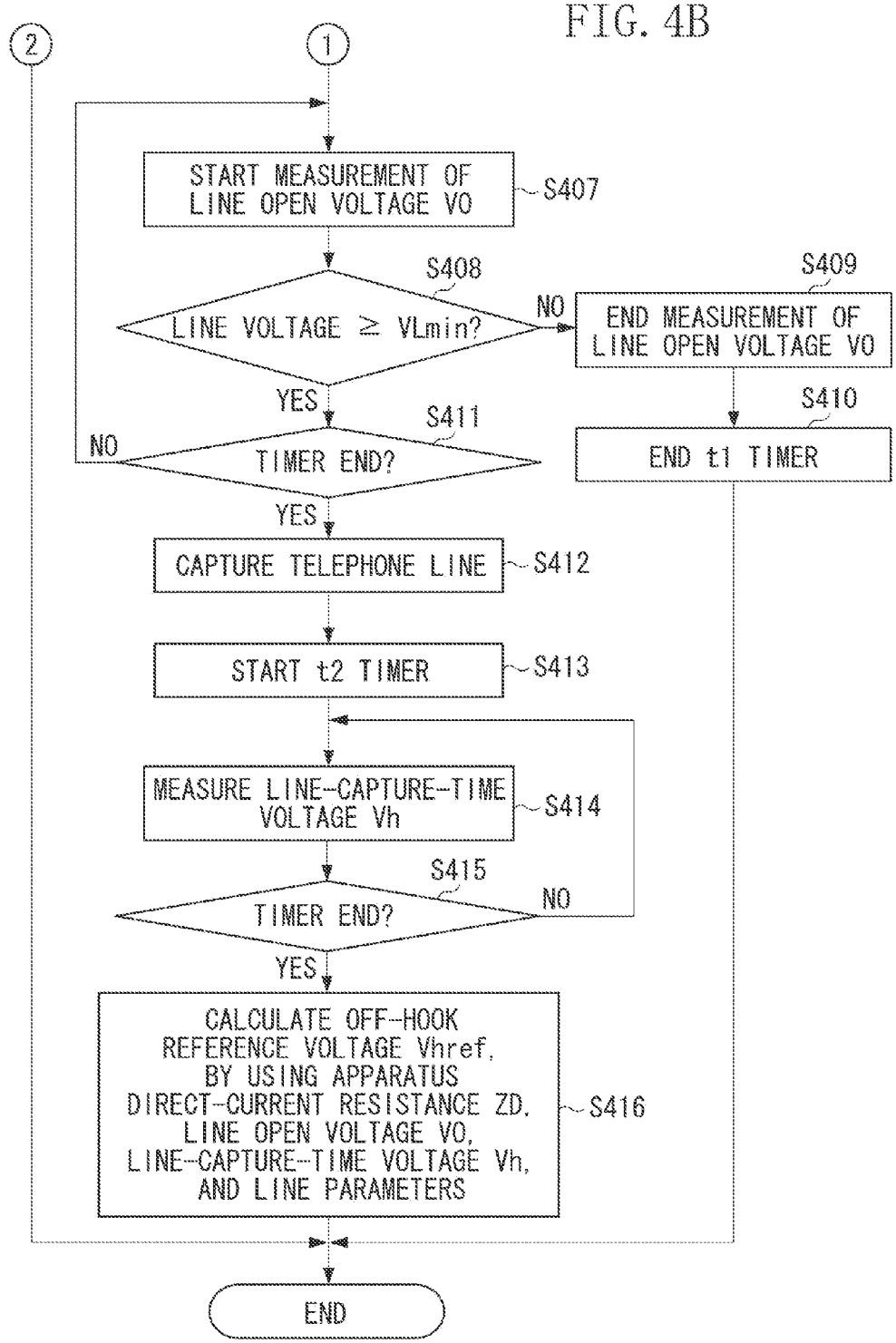

Embodiments will be described in detail below with reference to the drawings. In an example, a control unit of a facsimile apparatus performs control for detecting a line open voltage VO of a telephone line, detecting a line-capture-time voltage Vh of the telephone line, and determining a voltage (off-hook reference voltage Vhref) to be a threshold for determining a line capture, by using the line open voltage VO, the line-capture-time voltage Vh, a line parameter held beforehand in a ROM, and an apparatus direct-current resistance ZD.

FIG. 1 is a block diagram illustrating a configuration of a facsimile apparatus according to a first embodiment. The present embodiment is applicable to all kinds of apparatuses each having a facsimile unit with an external telephone terminal to which a telephone can be connected. An embodiment is applicable to, for example, an image forming apparatus such as a multifunction peripheral (MFP) having a facsimile function.

As illustrated in FIG. 1, a facsimile apparatus 100 includes a control unit 101 that controls the entire facsimile apparatus 100. A modem 102 is connected with the control unit 101 to communicate image data for facsimile communication. An insulation element circuit unit 103 is connected to the modem 102, and insulates the facsimile apparatus 100 from a telephone line 130. A Data Access Arrangement (DAA) 104 is connected to the insulation element circuit unit 103 on the telephone line 130 side thereof.

The DAA 104 controls circuits connected thereto on the telephone line 130 side. The DAA 104 performs capturing and disconnection of the telephone line 130, as well as transmission and reception of data, under control of the control unit 101 and the modem 102. A modem interface (I/F) unit 105 in the DAA 104 performs transmission/reception of data and transmission/reception of commands, by communicating with the modem 102 in a unique data communication method. A codec 106 is a digital-to-analog (D/A) and analog-to-digital (A/D) converter. The codec 106 receives digital data from the modem 102 and converts the received digital data into analog data. The codec 106 then transmits the analog data to a communication partner via the telephone line 130. In addition, the codec 106 receives a facsimile signal, which is an analog signal, from a communication partner, and converts the received signal into digital data. The codec 106 then transmits the digital data to the modem 102 via the modem I/F unit 105. A telephone line I/F unit 107 controls the circuits connected on the telephone line 130 side thereof, under control of the control unit 101 and the modem 102.

A receiving circuit unit 108 receives a signal on the telephone line 130, and outputs an alternating current signal for communication to the telephone line I/F unit 107. A transmission circuit unit 109 outputs a transmission signal output from the telephone line I/F unit 107 to the telephone line 130.

A direct current capturing circuit unit 110 captures and disconnects the telephone line 130, under control of the telephone line I/F unit 107. A rectifier circuit unit 111 is provided for supplying power to components such as the DAA 104 and the direct current capturing circuit unit 110, regardless of polarity of the telephone line 130.

A call signal detection unit 112 is a circuit for detecting a call signal on the telephone line 130, and connected to the telephone line 130 via an external element unit 113. A line voltage detection unit 114 samples a voltage of the telephone line 130 via the external element unit 113 and converts the sampled voltage into numerical data. The line voltage detection unit 114 then transmits this telephone line voltage in numerical data form to the modem 102 via the modem I/F unit 105. The call signal detection unit 112 and the line voltage detection unit 114 simultaneously operate. The line voltage detection unit 114 detects the voltage of a call signal, and the call signal detection unit 112 verifies whether the detected voltage is a call signal. The telephone line 130 is thus monitored.

A relay 115 connects and disconnects a terminal for connecting the external telephone, to and from the telephone line 130. A relay driving unit 116 drives the relay 115, under control of the control unit 101.

A read only memory (ROM) 117 is a flash ROM that stores, for example, a control program of the facsimile apparatus 100, user data, and facsimile image data. A random access memory (RAM) 118 stores the control program, and temporarily stores copy image data.

A timer unit 119 performs time measurement and, for example, used to input interrupt request to the control unit 101.

A reading unit 120 generates image data by reading an original document, and transmits the generated image data to the control unit 101. A recording unit 121 records image data such as an original document read by the reading unit 120 and image data received by the facsimile apparatus 100, under control of the control unit 101.

An operation display unit 122 is provided to display, for example, a state of the facsimile apparatus 100 and information, under control of the control unit 101. In addition, the operation display unit 122 inputs information into the control unit 101, upon receiving an input from a user. The operation display unit 122 includes a display unit 123 that displays the state of the facsimile apparatus 100 and the information. An operation input unit 124 includes keys and a touch panel for input by the user.

FIG. 2 is a block diagram illustrating an example of connection of the facsimile apparatus 100 with an external telephone 23 and the telephone line 130.

An exchanging system 20 supplies direct current power, telephone calls, and communication signals to a connected terminal. A first line resistor 21 and a second line resistor 22 are each a line resistor of a telephone line. Here, assume that the first line resistor 21 has a resistance value of RL1 and the second line resistor 22 has a resistance value of RL2. The external telephone 23 is connected to terminals T1 and T2 of the facsimile apparatus 100. The external telephone 23 is connected to and disconnected from the telephone line 130, under control of the facsimile apparatus 100. The facsimile apparatus 100 has an apparatus direct-current resistance ZD.

FIGS. 3A and 3B illustrate a line parameter table illustrating each country's standard, and a measurement data table, respectively, in the present embodiment. The table illustrated in each of FIGS. 3A and 3B is stored in the ROM 117, and used in line-voltage threshold-voltage decision (decision of off-hook reference voltage: Vhref) to be described below.

The line parameter table of each country's standard illustrated in FIG. 3A includes "line voltage maximum value: VLmax", "line voltage minimum value: VLmin", "terminal direct-current resistance maximum value: Zmax", and "terminal direct-current resistance minimum value: Zmin", for each country. The measurement table illustrated in FIG. 3B includes "apparatus direct-current resistance: ZD", "line open voltage: VO", "line-capture-time voltage: Vh", and "off-hook reference voltage: Vhref". These are stored in the ROM 117.

The "off-hook reference voltage: Vhref" is a voltage to be a threshold for determining line capture (a threshold voltage for off-hook determination). For example, the control unit 101 compares a detected line voltage with the off-hook reference voltage (Vhref), thereby performing determination (off-hook determination) as to whether a telephone line is captured (is in an off-hook state).

FIG. 4 is a flowchart illustrating operation (operation of off-hook reference voltage Vhref decision processing) of the facsimile apparatus 100. The control unit 101 implements processing in this flowchart, by executing a program stored in the ROM 117. The control unit 101 is assumed to start the operation illustrated in FIG. 4, in a following timing. Examples of the timings include timing of powering on (activating) the facsimile apparatus 100, and timing of the facsimile apparatus 100 returning from a power save mode (a power saving state). The examples of the timing further include timing of a signal being transmitted via the telephone line 130, timing of completing signal reception, timing of regular interval, and timing of receiving an instruction for executing the off-hook reference voltage Vhref decision processing from the operation display unit 122.

Figure 5:
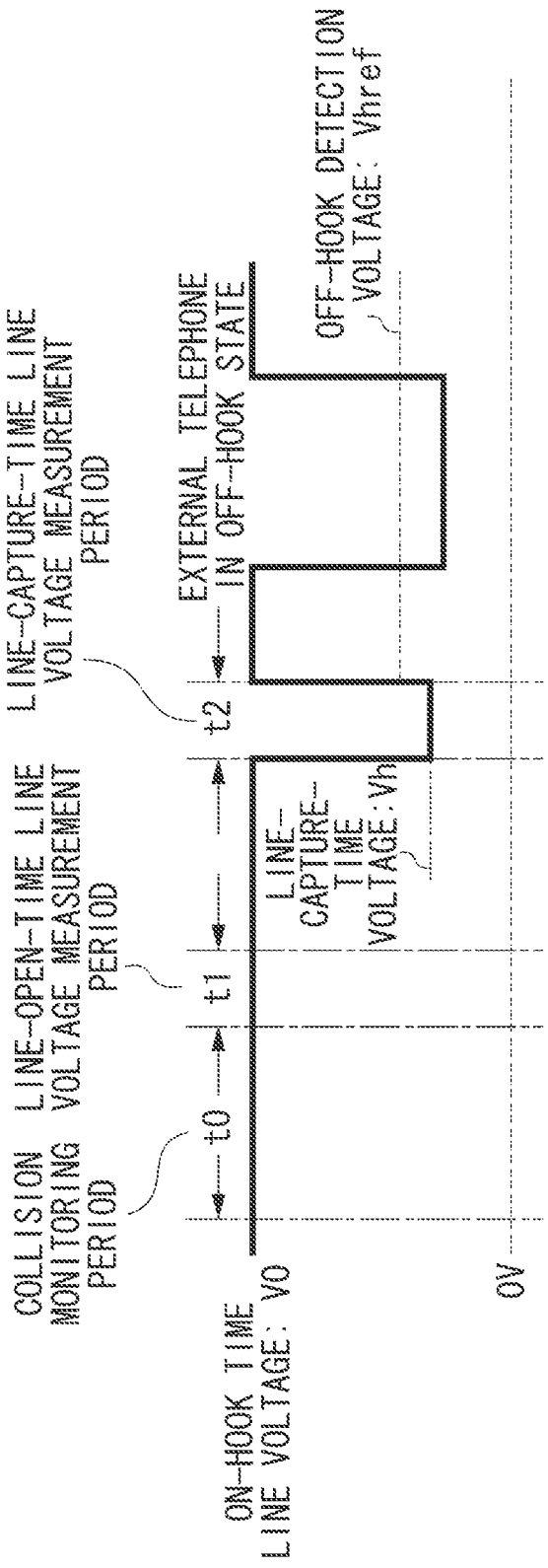
FIG. 5 is a diagram illustrating state transition of a telephone line voltage according to the first embodiment.

FIG. 5 is a diagram illustrating the state transition of a telephone line voltage. FIG. 5 illustrates a state of a telephone line in the present embodiment.

The operation in the off-hook reference voltage Vhref determination processing according to the present embodiment will be described below, mainly with reference to the flowchart in FIG. 4.

In step S401, the control unit 101 sets the timer unit 119 at t0, and starts a t0 timer. The control unit 101 thereby starts collision monitoring, i.e., detection of presence/absence of a call signal from the telephone line 130. In FIG. 5, a period corresponding to this t0 is indicated as "collision monitoring period".

Next, in step S402, the control unit 101 determines presence/absence of a call signal detected by the call signal detection unit 112 connected via the external element unit 113 connected to the telephone line 130 (whether the call signal is absent). When the control unit 101 determines that the call signal is detected (present) (NO in step S402), the processing in this flowchart ends, so that the facsimile apparatus 100 shifts to other operation such as facsimile reception operation and operation for external telephone off-hook.

On the other hand, when the control unit 101 determines that the call signal is not detected (absent) (YES in step S402), the processing proceeds to step S403.

In step S403, the control unit 101 executes measurement of the line open voltage VO, by driving the DAA 104 via the modem 102. At that time, the DAA 104 measures a voltage of the telephone line 130 and converts the measured voltage into data, at the line voltage detection unit 114.

Next, in step S404, the control unit 101 compares the line open voltage VO measured in step S403 with the line voltage minimum value VLmin (to determine whether the line open voltage VO is equal to or more than the line voltage minimum value VLmin). When the control unit 101 determines that the line open voltage VO is lower than the line voltage minimum value VLmin (NO in step S404), the control unit 101 recognizes that the external telephone 23 connected to the terminals T1 and T2 of the facsimile apparatus 100 is off-hook, and the processing in this flowchart ends.

On the other hand, when the control unit 101 determines that the line open voltage VO is equal to or higher than the line voltage minimum value VLmin (YES in step S404), the telephone line 130 is in an open state. The control unit 101 therefore determines to continue the collision monitoring, and the processing proceeds to step S405.

In step S405, the control unit 101 determines whether the t0 timer has ended. When the control unit 101 determines that the t0 timer has not ended (NO in step S405), the processing proceeds to step S402 to continue the collision monitoring until the t0 timer ends.

When the control unit 101 determines that the t0 timer has ended (YES in step S405), the telephone line 130 is confirmed to be in the open state, and therefore the processing proceeds to step S406.

In step S406, the control unit 101 sets the timer unit 119 to t1 to perform the measurement of the line open voltage VO again, and starts a t1 timer. In FIG. 5, a period corresponding to this t1 is indicated as "line-open-time line voltage measurement period".

Next, in step S407, the control unit 101 starts measurement of the line open voltage VO, by controlling the DAA 104. The control unit 101 stores data of the line open voltage VO from the DAA 104 into the RAM 118, and holds the data until the t1 timer ends. Upon ending of the t1 timer, the control unit 101 performs processing such as taking an average of the measured data, and stores the average value into the ROM 117 as the line open voltage VO. The line open voltage VO is not limited to the average of the measured data, and may be other statistical values such as a median value, a maximum value, and a minimum value.

Next, in step S408, the control unit 101 verifies whether the line open voltage VO transmitted from the DAA 104 is equal to or higher than the line voltage minimum value VLmin. When the control unit 101 determines that the line open voltage VO is lower than the line voltage minimum value VLmin (NO in step S408), the processing proceeds to step S409.

In step S409, the control unit 101 recognizes that the external telephone 23 is off-hook, and ends the measurement of the line open voltage VO.

Next, in step S410, the control unit 101 stops the timer unit 119 set to t1, and the processing in this flowchart ends.

On the other hand, when the control unit 101 determines that the line open voltage VO is equal to or higher than the line voltage minimum value VLmin (YES in step S408), the processing proceeds to step S411.

In step S411, the control unit 101 determines whether the t1 timer has ended. When the control unit 101 determines that the t1 timer has not ended (NO in step S411), the processing proceeds to step S407 to continue the measurement of the line open voltage VO until the t1 timer ends.

When the control unit 101 determines that the t1 timer has ended (YES in step S411), the processing proceeds to step S412. In this process, the control unit 101 finalizes the line open voltage VO, based on the line open voltages obtained by performing the measurement a plurality of times.

In step S412, the control unit 101 drives the direct current capturing circuit unit 110 by controlling the telephone line I/F unit 107 in the DAA 104, and thereby captures the telephone line 130.

Next, in step S413, the control unit 101 starts a t2 timer for measurement of the line-capture-time voltage Vh, by controlling the timer unit 119. In FIG. 5, a period corresponding to this t2 is indicated as "line-capture-time line voltage measurement period".

Next, in step S414, the control unit 101 drives the line voltage detection unit 114 by controlling the DAA 104, and thereby starts the measurement of the line-capture-time voltage Vh. The control unit 101 stores data of the line-capture-time voltage Vh from the DAA 104 into the RAM 118, and holds the data until the t2 timer ends. Upon ending of the t2 timer, the control unit 101 performs processing such as taking an average of the measured data, and stores the average value into the ROM 117 as the line-capture-time voltage Vh. The line-capture-time voltage Vh is not limited to the average value of the measured data, and may be other statistic values such as a median value, a maximum value, and a minimum value.

Next, in step S415, the control unit 101 determines whether the t2 timer has ended. When control unit 101 determines that the t2 timer has not ended (NO in step S415), the processing proceeds to step S414 to continue the measurement of the line-capture-time voltage Vh until the t2 timer ends.

When the control unit 101 determines that the t2 timer has ended (YES in step S415), the processing proceeds to step S416. At that time, the control unit 101 finalizes the line-capture-time voltage Vh, based on the line-capture-time voltages obtained by performing the measurement a plurality of times.

In step S416, after the end of the t2 timer, the control unit 101 determines the off-hook reference voltage Vhref, based on the apparatus direct-current resistance ZD of the facsimile apparatus 100, the line open voltage VO and the line-capture-time voltage Vh that are obtained in the above-described processing, and the line parameters. At that time, based on a country code held beforehand in the ROM 117, the control unit 101 acquires (selects) parameters corresponding to this country code, from the line parameter table illustrated in FIG. 3A.

Now, a method for determining the off-hook reference voltage Vhref will be described below by way of example.

An example of calculation of the off-hook reference voltage Vhref is described using a country code "01" in FIG. 3 as an example. In addition, the value of each of the apparatus direct-current resistance ZD, the line open voltage VO, and the line-capture-time voltage Vh in FIG. 3 is used as an example. In the description, constants I1 and I2 are used for convenience of description. The constant I1 is defined as a line electric current at the time of measurement of the line-capture-time voltage Vh. The constant I2 is defined as a line electric current at the time when the line voltage takes a maximum value.

With reference to FIG. 2, a relationship between the line-capture-time voltage Vh, the line open voltage VO, the apparatus direct-current resistance ZD, the first line resistance RL1, and the second line resistance RL2 is represented by Expression 1 as follows.

$$VO=\{(RL1+RL2)+ZD\} \times I1 \qquad \text{(Expression 1)}$$

$$VO=(RL1+RL2) \times I1+ZD \times I1 \qquad \text{(Expression 1')}$$

Further, the line-capture-time voltage Vh is represented by Expression 2 as follows.

$$Vh = ZD \times I1 \qquad \text{(Expression 2)}$$

Next, the following expression is obtained from Expression 1' and Expression 2.

$$VO = (RL1 + RL2) \times I1 + Vh$$

$$(RL1 + RL2) = (VO - Vh)/I1$$

Substituting a transformation of Expression 2 "I1=Vh/ZD" into this expression yields the following expressions.

$$(RL1 + RL2) = (VO - Vh)/(Vh/ZD)$$

$$(RL1 + RL2) = (VO - Vh)/Vh \times ZD \qquad \text{(Expressions 3)}$$

The line-capture-time voltage is maximized at the line voltage maximum value VLmax and the terminal direct-current resistance maximum value Zmax. Therefore, substituting these values into Expression 1 yields the following expression.

$$VLmax = \{(RL1 + RL2) + Zmax\} \times I2$$

$$I2 = VLmax/\{(RL1 + RL2) + Zmax\}$$

The off-hook reference voltage Vhref is represented by the product of the I2 and the terminal direct-current resistance maximum value Zmax. The following expression is therefore obtained.

$$Vhref = Zmax \times I2$$

Substituting "I2=VLmax/{(RL1+RL2)+Zmax}" into this expression yields the following expression.

$$Vhref = Zmax \times VLmax/\{(RL1 + RL2) + Zmax\}$$

Substituting Expression 3 into this expression yields Expression 4 as follows.

$$Vhref = Zmax \times VLmax/\{(VO - Vh)/Vh \times ZD + Zmax\} \qquad \text{(Expression 4)}$$

The off-hook reference voltage Vhref is calculated using each value corresponding to the country code "01" illustrated in FIG. 3A, and data illustrated in FIG. 3B. In other words, substituting "Zmax=300", "VLmax=53", "VO=50", "Vh=7.5", and "ZD=150" into Expression 4 yields the following result.

$$Vhref = 300 \times 53/\{(50 - 7.5)/7.5 \times 150 + 300\} = 13.8 \text{ (V)}$$

The control unit 101 stores the calculated value "Vhref=13.8 (V)" into the ROM 117, and the determination ends.

Thereafter, during the line voltage monitoring, the control unit 101 determines that the external telephone 23 is off-hook, if the line voltage is higher than 0V and equal to or lower than "Vhref=13.8 V" described above.

In FIG. 5, "off-hook reference voltage Vhref" is illustrated after "line-capture-time line voltage measurement period". FIG. 5 also illustrates the state of the line voltage at the time of "external telephone in an off-hook state".

As described above, the facsimile apparatus 100 employing the DAA 104 measures the voltage at the line-open time and the voltage at the line-capture time, and uses the telephone line parameter values corresponding to the standard of each country. The facsimile apparatus 100 can therefore readily predefine an off-hook detection voltage of the external telephone 23. In addition, the facsimile apparatus 100 automatically performs the above-described measurement, and updates the off-hook detection voltage. Thus, the facsimile apparatus 100 can constantly respond to also property variations of the telephone line 130 due to factors such as fluctuations in the telephone line voltage and changes in the apparatus installation situation. This can prevent occurrence of off-hook false detection.

In addition, the minimum value of the off-hook reference voltage Vhref also can be readily obtained. The minimum value of the off-hook reference voltage Vhref is calculated using each value of the country code "01" illustrated in FIG. 3 and using the terminal direct-current resistance minimum value Zmin.

In other words, substituting "Zmin=50", "VLmax=53", "VO=50", "Vh=7.5", and "ZD=150" into Expression 4 yields the following result.

$$Vhref = 50 \times 53/\{(50 - 7.5)/7.5 \times 150 + 50\} = 2.3 \text{ (V)}$$

Using this result and the result described above, a range of the off-hook reference voltage may be predefined to be 2.3 V to 13.8 V.

The control unit 101 then determines the off-hook reference voltage from this range of the off-hook reference voltage (the range of 2.3 V to 13.8 V in the example described above). For example, the control unit 101 determines the minimum value in the above-described range of the off-hook reference voltage, as the off-hook reference voltage. The user may be allowed to specify the off-hook reference voltage within this range, via a user interface.

In the present embodiment, one example of the Vhref calculation is described. However, an embodiment includes a case where a similar method and/or other parameters are used, if an effect similar to the effect of the present embodiment can be obtained.

As described above, according to the present embodiment, the off-hook detection voltage is determined considering the result obtained from the automatic measurement by the facsimile apparatus 100, and the telephone line standard. Therefore, the off-hook false detection in the facsimile apparatus 100 can be prevented by determining the off-hook detection voltage within the range of the standard of the telephone line, even if the line voltage varies, or the external telephone or the line is changed.

For example, the off-hook false detection can be prevented in an image processing apparatus including a facsimile function using a DAA.

According to a second embodiment, a direct current resistance of a facsimile apparatus is changed a plurality of times, and a voltage at a line-capture time is measured for each of the direct current resistances. Using a result of this measurement, an off-hook reference voltage is determined.

In other words, the control unit 101 performs control as follows. The control unit 101 changes the direct current resistance of the facsimile apparatus 100 a plurality of times when the line is captured, by controlling the telephone line I/F unit 107. The control unit 101 then measures a voltage at a line-capture time, for each change of the direct current resistance. The control unit 101 then compares the voltage at the line-capture time measured for each change of the changed direct current resistance with the line parameter, and determines the off-hook reference voltage by performing computing based on the comparison.

For example, the control unit 101 measures the voltage at the line-capture time, for each of a case where the direct current resistance of the facsimile apparatus 100 is Zmax, and a case where the direct current resistance of the facsimile apparatus 100 is Zmin. The control unit 101 determines the maximum value and the minimum value of the off-hook reference voltage Vhref, by using the respective measured voltages.

In another example, the control unit 101 changes the direct current resistance value of the facsimile apparatus 100 a plurality of times, and determines the off-hook reference voltage Vhref corresponding to each of the direct current resistance values by using Expression 4 described above. The off-hook reference voltage may be determined by processing these values with a statistical technique (e.g., calculating an average value or median value).

According to a third embodiment, the control unit 101 may be configured to perform control for causing the telephone line I/F unit 107 to detect an electric current at the line-capture time, when the line is captured. This makes it possible to measure a line electric current I1 at the time of the measurement of the line-capture-time voltage Vh. Based on this line electric current I1 at the time of the measurement of the line-capture-time voltage Vh, the line-capture-time voltage Vh, the apparatus direct-current resistance ZD, and the line open voltage VO, a line resistance value (RL1+RL2) can be easily determined as expressed by "(RL1+RL2)=VO/I1−ZD".

In other words, according to the third embodiment, the control unit 101 performs control as follows. The control unit 101 measures the line-capture-time voltage Vh and the line-capture-time electric current I1, when the line is captured. The control unit 101 then determines the off-hook reference voltage, by using these values.

As described above, according to the embodiments, the off-hook false detection can be automatically prevented, even if the line voltage varies, or the external telephone or the line is changed.

The configurations of various data and contents described above are not limited thereto. The various data may have various configurations and contents, depending on a use and/or a purpose.

Although some embodiments are described above, an embodiment can be implemented in any modes including a system, an apparatus, a method, a program, and a storage medium. Specifically, an embodiment may be applied to a system including a plurality of devices, or may be applied to an apparatus configured of one device.

Moreover, an embodiment can include configurations in combinations of the above-described embodiments.

Other Embodiments

The embodiments are not limited to the above-described embodiments, and allows various modifications (including organic combinations of the embodiments), without excluding these modifications from the scope of the embodiments. In other words, an embodiment also includes configurations in combinations of the above-described embodiments and modifications.

According to an embodiment, the off-hook false detection can be automatically prevented, even if a line voltage varies, or an external telephone or a line is changed.

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-005775, filed Jan. 15, 2016, which is hereby incorporated by reference herein in its entirety.

What is claimed is:

1. A facsimile apparatus which is able to connect with an external telephone, the facsimile apparatus comprising:
    a line capture configured to capture a telephone line;
    a detector configured to detect a voltage of the telephone line; and
    at least one processor configured to cause the facsimile apparatus to perform operations including:
    setting a first value based on the first voltage detected by the detector when the telephone line is not captured by the line capture,
    setting a second value based on second voltage detected by the detector when the telephone line is captured by the line capture, and
    setting a threshold for detecting picking up of a telephone receiver,
    wherein the threshold is calculated by using the first value and the second value.

2. The facsimile apparatus according to claim 1,
    wherein the line capture includes a plurality of resistors different in resistance value, and
    wherein the operations further include detecting voltage to be detected by the detector when the telephone line is captured using each of the plurality of resistors.

3. The facsimile apparatus according to claim 1,
    wherein the operations further include measuring a current value of a current that is flowing when the telephone line is captured, and
    wherein the threshold is a value calculated using the measured current value.

4. The facsimile apparatus according to claim 1, wherein the operations further include:
    detecting, by the detector, voltage a plurality of times when the telephone line is not captured, and setting the first value from the detected voltages, and
    detecting, by the detector, voltage a plurality of times when the telephone line is captured a plurality of times, and setting the second value calculated from the detected voltages,
    wherein the threshold is a value calculated using the first value and the second value.

5. The facsimile apparatus according to claim 1, wherein the operations further include detecting voltage to be detected by the detector when the telephone line is not captured and voltage to be detected by the detector when the telephone line is captured, after at least one of activating the facsimile apparatus, returning the facsimile apparatus from a power saving state, and setting instruction of the threshold from a user.

6. The facsimile apparatus according to claim 1, further comprising a storage device storing voltage of a telephone line determined according to a telephone line standard of each country,
    wherein the operations further include obtaining, from the storage device, a line voltage defined by the telephone line standard of each country and a resistance value of the telephone defined by the telephone line standard of each country, and
    wherein the threshold is a value calculated by using the obtained line voltage and the obtained resistance value of the telephone.

7. The facsimile apparatus according to claim 6, wherein the storage device stores at least one of a maximum voltage value of the telephone line, a minimum voltage value of the telephone line, a maximum resistance value of the telephone, and a minimum resistance value of the telephone.

8. The facsimile apparatus according to claim 6,
    wherein the storage device stores a maximum value of the telephone line, a minimum value of the telephone line, a resistance maximum value of the telephone, and a resistance minimum value of the telephone, and
    wherein, the operations further include detecting picking up of the telephone receiver, in a case where the voltage to be detected by the detector is larger than a threshold calculated using the first value, the second value, the minimum value stored in the storage device, and the resistance minimum value stored in the storage device and smaller than a threshold calculated using a potential difference obtained when the telephone line is opened, the potential difference obtained when the circuit captures the telephone line, the maximum value stored in the storage device, and the resistance maximum value stored in the storage device.

9. The facsimile apparatus according to claim 6,
    wherein the circuit includes at least one resistor, and
    wherein the threshold is calculated by using the resistance value of the resistor.

10. The facsimile apparatus according to claim 6, wherein a state in which the circuit connects to the telephone line is a state in which the circuit is provided with an electric current and a state in which the circuit does not connect to the telephone line is a state in which the circuit is not provided with an electric current.

11. The facsimile apparatus according to claim 1, wherein the operations further include detecting the picking up of a telephone receiver according to the voltage to be detected by the detector being smaller than the threshold.

12. The facsimile apparatus according to claim 1,
    wherein the operations further include determining whether the facsimile apparatus receives from the telephone line a signal based on reception of a facsimile,
    wherein the detector detects, in a state in which the facsimile apparatus does not receive from the telephone line the signal based on the reception of the facsimile, a voltage obtained when the circuit connects to the telephone line and a voltage in a voltage obtained when the circuit does not connect to the telephone line.

13. The facsimile apparatus according to claim 12, wherein the circuit connects to the telephone line according to the facsimile apparatus having received from the telephone line the signal based on the reception of the facsimile.

14. A control method for a facsimile which is able to connect with an external apparatus, the control method comprising:
    capturing, by a line capture, a telephone line;
    detecting, by a detector, a voltage of the telephone line; and
    setting a first value based on the first voltage detected by the detector when the telephone line is not captured by the line capture,
    setting a second value based on second voltage detected by the detector when the telephone line is captured by the line capture, and
    setting a threshold for detecting picking up of a telephone receiver,
    wherein the threshold is calculated by using the first value and the second value.

15. The control method according to claim 14, further comprising:
    obtaining, from the storage device, a line voltage defined by a telephone line standard of each country and a resistance value of the telephone defined by the telephone line standard of each country; and
    calculating the threshold by using the first value, the second value, the line voltage defined by the telephone line standard of each country and the resistance value of the telephone defined by the telephone line standard of each country.

* * * * *